Patented Mar. 6, 1945

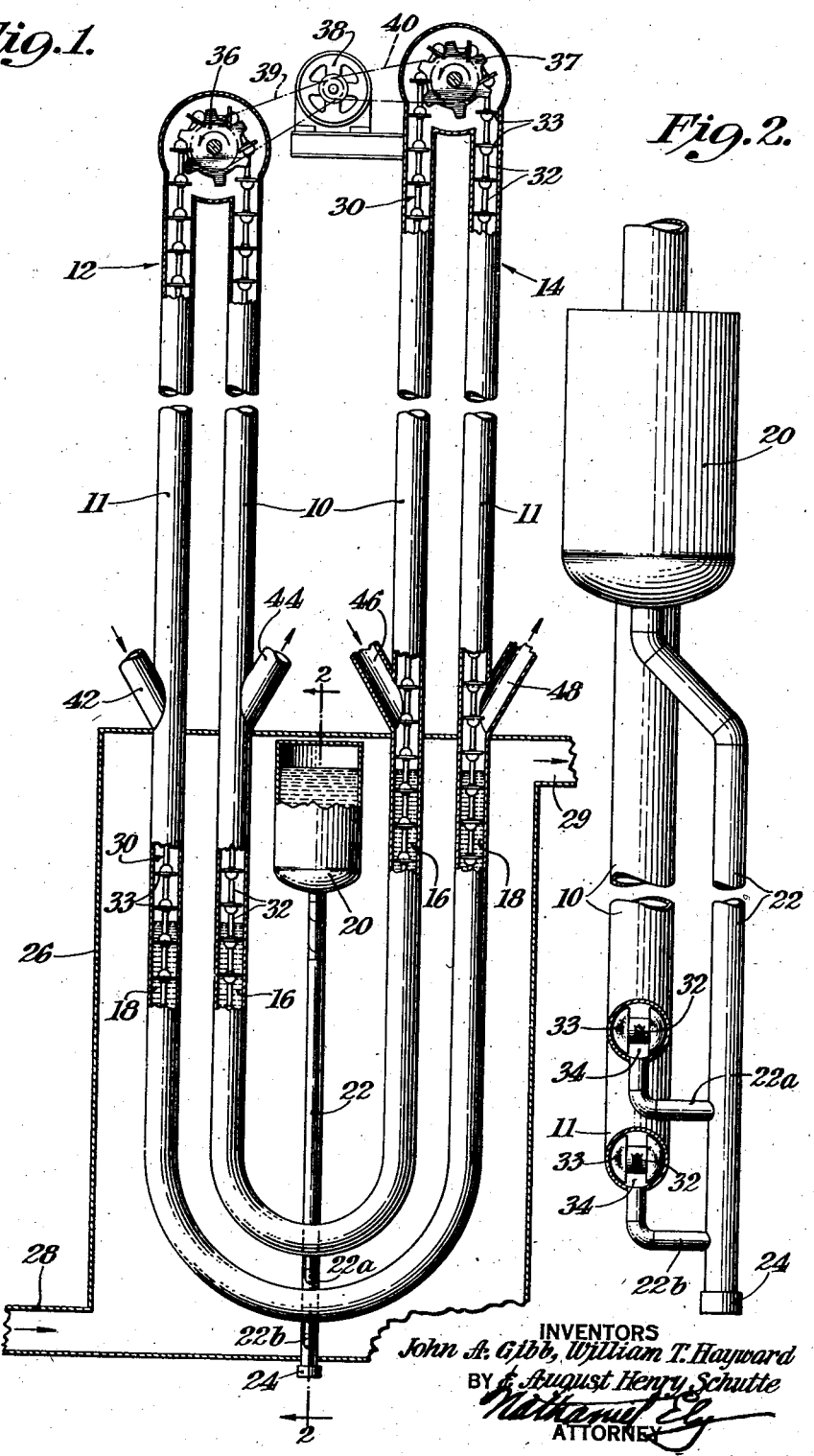

2,370,950

UNITED STATES PATENT OFFICE 2,370,950

CATALYSIS

John A. Gibb, Northport, William T. Hayward, Hastings on Hudson, and August Henry Schutte, Westchester, N. Y., assignors to The Lummus Company, New York, N. Y., a corporation of Delaware Application November 15, 1941, Serial No. 419,278

11 Claims. (Cl. 196—52)

This invention relates to the treatment of reactants in the presence of a contact material and more particularly to an improved method of and apparatus for continuously effecting a chemical reaction in the presence of a catalyst. It is a modification of the invention described in the copending application of A. H. Schutte, S. N. 394,823, filed May 23, 1941, which is a continuation-in-part of the prior copending application of A. H. Schutte, S. N. 302,278, filed November 1, 1939, now Patent No. 2,268,535, issued December 30, 1941.

The use of a contact material such as a catalyst or the like to accelerate a desired chemical reaction or to carry out such a reaction at a low temperature or pressure or to accomplish such a reaction more selectively is well known. Heretofore, however, it has been customary to employ the catalyst in a fixed position in a reaction chamber during the reaction period and frequently also during the reactivation period. This procedure necessarily results in discontinuous operation requiring the use of at least two and generally more reaction chambers inasmuch as the catalyst must be periodically reactivated.

It will be apparent that, because of the periodic nature of the discontinuous operation, a truly continuous operation is more desirable. When such operation is contemplated, however, the use of a catalyst in granular form is desirable; and the difficulty of continuously introducing a granular catalyst into and removing it from the reaction chamber without loss or contamination of the reactants and without attrition of the catalyst must be considered.

The use of a liquid seal, particularly a seal of a non-wetting, inert liquid, for such continuous catalytic operation has been disclosed in the prior copending applications of A. H. Schutte, S. N. 302,278 and S. N. 394,823. Such a seal effectively prevents loss or contamination of the reactants and reduces the attrition of the moving granular catalyst to a minimum.

Our invention relates to modified method and apparatus of the type disclosed in the copending applications of Schutte.

An object of our invention is to provide a unitary operation in which a granular contact material can be continuously utilized in treating reactants, thereafter continuously reactivated, and subsequently returned to the treating zone for further use.

One of the principal objects of our invention is to provide a unitary apparatus for the continuous treatment of fluid reactants with a granular contact material and for the simultaneous but separate continuous reactivation of such contact material.

A further object of our invention is to provide a continuous type of catalytic reactor in which a vapor phase chemical reaction can be continuously carried out in the presence of a granular catalyst and in which the granular catalyst can be continuously and simultaneously but separately reactivated.

Another object of our invention is to provide a continuous type of unitary catalytic reactor having individual catalytic reaction and catalyst reactivation zones separated by a liquid seal.

Further objects and advantages of our invention will appear from the following description of a preferred form of embodiment thereof taken in connection with the attached drawing illustrative thereof, in which:

Fig. 1 represents a diagrammatic elevational view with parts broken away and parts in section of a form of embodiment of our improved continuous catalytic apparatus and Fig. 2 represents a detailed side view taken substantially along the line 2—2 of Fig. 1.

The apparatus contemplated by our invention comprises a unitary closed system including reaction and reactivation zones separated by a liquid seal, through all of which a granular contact material is continuously moved. The granular material is caused to move in a continuous closed cycle for contact alternately with the reactants and with the reactivating medium. For convenience only, our invention will be described as applied to a chemical reaction conducted in the vapor phase in the presence of a granular catalyst.

The catalytic reactor shown in the drawing comprises a unitary apparatus designed to carry out a catalytic reaction in the presence of a continuously moving catalyst body. This apparatus includes a pair of interconnected U-tube conduits 10 and 11, which are preferably cylindrical but which may have any other shape desired. These conduits form a continuous closed system or path which includes the catalytic reaction zone or chamber 12 and the catalyst reactivation zone or chamber 14.

According to our invention, a body of granular catalytic material is maintained in this unitary apparatus and is continuously circulated in the closed path formed by the interconnected U-tube conduits alternately through the reaction zone and through the reactivation zone. These two zones are operated simultaneously but necessarily separately, and contamination of the vapors and gases in one zone with those in the other zone is particularly to be avoided so that a high degree of efficiency can be obtained. Furthermore, although the operating pressure in both zones may be substantially the same, the reactions in the two zones are usually carried out at different absolute pressures; for example, in the case of hydrocarbon conversion reactions, the pressure in the reaction zone is generally maintained above atmospheric while that in the reactivation zone is generally maintained about atmospheric.

In order to accomplish continuous and simultaneous operation, we provide a seal, preferably a liquid seal, in the lower portion of both U-tubes as indicated at 16 and 18 to separate the reaction zone from the reactivation zone. The amount of sealing liquid in both tubes is such that a column of liquid is formed in each conduit to balance the differential pressure between the two zones. A surge tank 20 is conveniently provided to reduce the effect of a sudden pressure change, which might cause the sealing liquid to flow into the inlet and outlet connections of either zone. The surge tank is interconnected with conduits 10 and 11 by pipes 22 and 22a and 22b, respectively. A cleaning or draining connection may be provided at 24 if desired.

The liquid used to effect the seal should have certain characteristics and should be selected with regard to the particular operating conditions employed and the particular treatment or reaction contemplated. Such sealing liquid should have a freezing point sufficiently below and a boiling point sufficiently above the reaction temperature so that slight temperature variations within the catalytic reaction chamber will not alter the physical state of the sealing liquid. It is desirable to use a liquid having a specific gravity such that the necessary liquid head to balance the differential pressure can be maintained within a reasonable height. The specific gravity of the liquid should preferably be greater than that of the catalyst or other contact material so that the catalyst particles can readily be moved through the liquid seal. The liquid should have a high surface tension so that it does not wet or adhere to the catalyst particles in any way, and it should not react chemically with the catalyst; otherwise, the catalytic reaction may not be satisfactorily carried out, or the activity of the catalyst may be adversely affected. It is also preferable that gases dissolve in the liquid to a negligible extent.

Since most catalytic reactions are carried out at an elevated temperature, it is necessary to maintain the liquid seal at the desired operating temperature level for most efficient operation. For this purpose I surround the lower portion of the U-tube conduits with a heating jacket or chamber 26, through which a heating medium such as flue gas or the like can be circulated as by means of inlet 28 and outlet 29.

In order that the granular catalytic material can be continuously moved through the reaction and reactivation zones as well as the liquid seal, we provide suitable conveying means such as the continuous link conveyor 30. This conveying device desirably consists of a series of individual links 32, which are preferably articulated in any well known manner for continuous passage through conduits 10 and 11. In the form of embodiment shown, these links have flights 33, the cross section of which is substantially the same as that of the U-tubes so that a relatively close fit can be obtained if desired. These flights serve to move the catalyst particles through the U-tube conduits. As shown in Fig. 2, the flights have openings 34 so that, as the solid granular material is carried along thereby through the liquid seal and the reaction and reactivation zones, the liquid is left behind. Pulleys 36 and 37, operated by motor 38 as through belts 39 and 40, may conveniently be used to move the continuous conveyor 30 through the closed U-tube circuit. It will be understood, however, that our invention is not limited to the type of continuous conveyor shown in the drawing. For example, a screw-type conveyor (not shown) may be used in each vertical leg of the U-tube conduits to move the granular catalytic material through each zone and through the liquid seal.

In operation, gaseous or vaporous reactants at a suitable temperature are continuously introduced into reaction zone or chamber 12 through the inlet connection or conduit 42 for contact with the desired granular catalytic material. Although the reactants and the catalyst may be moved through the reaction zone either concurrently or countercurrently, in the embodiment shown we have indicated a countercurrent operation, which is generally to be preferred. The reactants flow through the reaction zone 12 and are removed therefrom through the discharge conduit 44.

After contact with the reactants, the catalyst particles become at least partially fouled with impurities and the like deposited thereon and must be reactivated before being used again. The fouled catalyst granules are accordingly continuously moved from reaction zone 12 through liquid seal 18 into reactivation zone or chamber 14, wherein they are continuously reactivated in the presence of a suitable fluid reactivating medium such as a flue gas of controlled oxygen content introduced through inlet connection 46. As in the reaction zone, the reactivating medium and the catalyst granules are preferably passed countercurrently to each other through the reactivation zone. The reactivating medium is discharged from this zone through a suitable discharge nozzle or conduit 48; and the reactivated catalyst particles are continuously moved from reactivation zone 14 through liquid seal 16 into reaction zone 12 for contact with additional vaporous reactants.

The length of zones 12 and 14 is governed, in general, by the characteristics of the particular reaction being carried out and of the particular contact material used. It will usually be determined primarily by such factors as the degree of reaction or conversion desired and the time required to effect such reaction. Suitable insulation (not shown) may be provided for these zones so that a drop in temperature because of heat loss therefrom may be avoided.

The inlet and discharge connections for both the reaction and the reactivation zones are desirably so positioned in the U-tube conduits that they are sufficiently above the normal level of the liquid seal to avoid the flow of sealing liquid thereinto under ordinary circumstances. Although these connections are shown to be attached at an angle to conduits 10 and 11, they need not necessarily be so positioned; when they are so attached, however, there is less possibility that the sealing liquid can flow therethrough under a sudden surge of pressure.

It will be appreciated that provision will ordinarily be made in discharge conduits 44 and 48 for the separation of any entrained catalyst particles from the vapors and/or gases flowing therethrough. A screen (not shown) or the like may conveniently be provided for this purpose. Suitable pressure control valves (also not shown) may likewise be provided in discharge conduits 44 and 48, if desired, to control the pressure under which the reaction zone and the reactivation zone are maintained. Suitable valves (not shown) may also be provided for inlet connections 42 and 46 in accordance with customary practice. It will also be understood that suitable provision may be made to introduce fresh granular catalyst into the body of catalyst continuously moving in the closed circuit and to remove fouled catalyst therefrom if such operation is found desirable or necessary.

Molten metals have been found especially suitable as the liquid sealing medium since most catalytic or contact reactions must be carried out at elevated temperatures. Because of their higher specific gravity, molten metals such as lead are particularly to be preferred when the reaction requires a pressure substantially in excess of atmospheric. Normally liquid materials such as mercury, molten alloys, or the like may also be used.

Molten lead is found most satisfactory for use with bauxite and similar clay-like catalysts often used in petroleum hydrocarbon reactions. It has a sufficiently high specific gravity so that a differential pressure of about 100 pounds per square inch can be used without an unduly high column of liquid in the seal. Furthermore, it has a high surface tension so that it does not wet clay catalysts; it does not react chemically with these catalysts; and it does not materially vaporize at reaction temperatures in the range of 800–1,000° F. Under such conditions, the catalytic dehydrogenation or desulfurization of petroleum hydrocarbons with bauxite or the catalytic cracking or reforming of petroleum fractions with an alumina-silica catalyst or other petroleum converting or refining operations involving a clay-type catalyst may be successfully carried out.

It will be understood that our invention is not to be strictly confined to a catalytic reactor having the U-tube configuration shown in the drawing. For example, the conduits comprising either the reaction zone or the reactivation zone or both may be positioned at an angle with the horizontal instead of vertically, if desired, so that the reactor has a configuration approaching that of a V. Furthermore, any conduit configuration may be used provided that it comprises a continuous closed circuit or system which has a low point in at least one portion thereof and which includes a reaction zone and a reactivation zone separated by a liquid seal having a height sufficient to balance the differential pressure therebetween, through all of which a granular catalyst is moved by a suitable continuous conveyor mechanism.

Our invention may also be applied to a series operation in which several reaction and reactivation zones separated by liquid seals, through all of which a conveyor continuously moves a granular catalyst or the like, are interconnected for continuous operation for any desired purpose.

Although we have shown a preferred form of embodiment of our invention, it will be understood that modifications may be made thereto; therefore, only such limitations as appear in the claims appended hereinafter should be applied.

We claim:

1. A catalytic reactor comprising a continuous closed multiple U-tube conduit including a catalytic reaction zone, conduits for continuously introducing vaporous reactants into said zone and withdrawing reacted products therefrom, a separate catalyst reactivation zone, conduits for continuously introducing a reactivating medium into said zone and withdrawing it therefrom, said zones being maintained at different pressures, a column of a molten metal in the lower portion of each U-tube having a head sufficient to prevent vapor leakage between the zones, said molten metal being non-wetting and non-reactive with respect to the catalyst used, and an endless conveyor to move a granular catalyst through said zones and said columns of molten metal.

2. The catalytic reactor as claimed in claim 1, which includes means to maintain the metal in molten condition.

3. A catalytic reactor comprising a continuous closed multiple U-tube conduit including a catalytic reaction zone, conduits for continuously introducing vaporous hydrocarbon reactants into said zone and withdrawing reacted products therefrom, a separate catalyst reactivation zone, conduits for continuously introducing a reactivating medium into said zone and withdrawing it therefrom, said zones being maintained at different pressures, a column of molten lead in the lower portion of each U-tube having a head sufficient to prevent vapor leakage between the zones, and an endless conveyor to move a granular clay-like catalyst through said zones and said columns of molten lead.

4. In the method of continuously effecting a chemical reaction in the presence of a body of a contact material, part of which simultaneously undergoes separate reactivation, the steps of circulating said body of contact material in a continuous stream through a closed circuit which includes a reaction zone and a separate reactivation zone for contact alternately with reactants and a reactivating medium and maintaining bodies of a liquid between the reaction zone and the reactivation zone to prevent leakage therebetween, said contact material also passing through said bodies of liquid.

5. In the method of continuously effecting a chemical reaction in the presence of a body of a granular contact material, part of which simultaneously undergoes separate reactivation, the steps of continuously circulating said body of granular contact material through a continuous closed circuit which includes a reaction zone and a separate reactivation zone maintained under different pressures for contact alternately with reactants and a reactivating medium and sealing the reaction zone and the reactivation zone to prevent leakage therebetween by maintaining columns of a liquid having a head sufficient to balance the differential pressure between the two zones, said granular contact material also passing through said columns of liquid.

6. In the method of continuously effecting a chemical reaction in the presence of a body of a granular catalytic material, part of which simultaneously undergoes separate reactivation, the steps of continuously circulating said body of granular catalytic material through a continuous closed conduit system which includes a reaction zone and a separate reactivation zone maintained under different pressures for contact alternately with reactants and a reactivating medium and maintaining between the reaction zone and the reactivation zone to prevent leakage therebetween columns of a liquid having a head sufficient to balance the differential pressure between the two zones, said granular catalytic material also passing through said columns of liquid, and said liquid being substantially non-wetting and non-reactive with respect to the catalytic material.

7. In the method of continuously effecting a chemical reaction in the presence of a body of a granular catalyst, part of which simultaneously undergoes separate reactivation, the steps of continuously circulating said body of granular catalyst through a continuous closed conduit system which includes a reaction zone and a separate reactivation zone maintained under different pressures for contact alternately with reactants and a reactivating medium and maintaining between the reaction zone and the reactivation zone to prevent leakage therebetween columns of a molten metal having a head sufficient to balance the differential pressure between the two zones, said granular catalyst also passing through said columns of molten metal, and said molten metal being substantially non-wetting and non-reactive with respect to the catalyst and being substantially non-volatile under the conditions of operation.

8. In the method of continuously effecting a hydrocarbon vapor phase reaction in the presence of a body of a granular clay-like catalyst, part of which simultaneously undergoes separate reactivation, the steps of continuously circulating said body of granular clay-like catalyst through a continuous closed conduit system which includes a reaction zone and a separate reactivation zone maintained under different pressures for contact alternately with reactants and a reactivating medium and maintaining between the reaction zone and the reactivation zone to prevent leakage therebetween columns of molten lead having a head sufficient to balance the differential pressure between the two zones, said granular clay-like catalyst also passing through said columns of molten lead, and said molten lead being substantially non-wetting and non-reactive with respect to the clay-like catalyst.

9. A continuous catalytic reaction apparatus comprising an endless conduit having successive lengths thereof formed to define a catalytic reaction zone, a catalyst reactivation zone and a plurality of wells spaced along the conduit and arranged in alternation with said zones, bodies of liquid within said wells and forming liquid seals to prevent exchange of gas between said zones, conduits for continuously introducing fluid reactants into the reaction zone and withdrawing reaction products therefrom, means for continuously passing a catalyst-reactivating medium through the reactivation zone, an endless conveyor extending through said zones and seals, and means for driving said conveyor, said zone-defining conduit and said conveyor being constructed and arranged to cooperate for passage by the conveyor of a solid catalyst in a divided state through said reaction zone and said reactivation zone in succession and thence back to the reaction zone for reuse within the latter, the liquid of said seals being non-wetting and non-reactive with respect to the catalyst.

10. Apparatus for performing a contact process, comprising an endless conduit having a pair of substantially U-shaped length portions arranged one within the other in an upright plane and having other portions interconnecting the upper ends of adjacent legs of said U-portions, bodies of liquid within the bends of said U-portions, one pair of the adjacent interconnected legs of said U-portions defining a contact zone and the other pair of adjacent interconnected legs of the U-portions defining a reactivation zone, said liquid bodies forming seals to prevent exchange of gas between said zones, pulleys in said interconnecting portions of the conduit, an endless conveyor trained over said pulleys and extending throughout said U-portions of the conduit, means for driving one of said pulleys, said conduit and said conveyor being constructed and arranged to cooperate for passage by the conveyor of a solid contact material in a divided state through the contact zone and the reactivation zone in succession and thence back to the contact zone for reuse within the latter, the liquid of the seals being non-wetting and non-reactive with respect to the contact material.

11. A catalytic reaction apparatus comprising an endless conduit having a pair of substantially U-shaped upright length portions and having other portions interconnecting the upper ends of adjacent legs of said U-portions, bodies of liquid within the bends of said U-portions, one pair of the adjacent interconnected legs of said U-portions defining a catalytic reaction zone and the other pair of adjacent interconnected legs of the U-portions defining a catalyst reactivation zone, said liquid bodies forming seals to prevent exchange of gas between said zones, conduits for continuously introducing fluid reactants into the reaction zone and withdrawing reaction products therefrom, means for continuously passing a reactivating medium through the reactivation zone, pulleys in said interconnecting portions of the conduit, an endless conveyor trained over said pulleys and extending throughout said U-portions of the conduit, and means for driving one of said pulleys to move the conveyor continuously, said zone-defining conduit and said conveyor being constructed and arranged to cooperate for continuous passage by the conveyor of a solid catalyst in a divided state through the reaction zone and the reactivation zone in succession and thence back to the reaction zone.

JOHN A. GIBB.
WILLIAM T. HAYWARD.
AUGUST HENRY SCHUTTE.